United States Patent [19]

Miller

[11] 4,436,325
[45] Mar. 13, 1984

[54] COUPLING

[75] Inventor: Jack E. Miller, Houston, Tex.

[73] Assignee: Big Inch Marine Systems, Inc., Houston, Tex.

[21] Appl. No.: 320,889

[22] Filed: Nov. 16, 1981

Related U.S. Application Data

[63] Continuation-in-part of Ser. No. 214,251, Dec. 8, 1980, abandoned.

[51] Int. Cl.³ .................... F16L 55/00; F16L 37/18; F16L 25/00; F16J 15/00
[52] U.S. Cl. .................................... 285/18; 285/86; 285/315; 285/331
[58] Field of Search ............... 285/18, 86, 96, 315, 285/331, 381

[56] References Cited

U.S. PATENT DOCUMENTS

| | | |
|---|---|---|
| 3,149,860 | 9/1964 | Hallesy ............................ 285/18 |
| 3,713,675 | 1/1973 | White ............................ 285/18 X |
| 3,784,234 | 1/1974 | Mohr ............................ 285/18 |
| 3,977,702 | 8/1976 | White et al. ............................ 285/18 |
| 4,006,921 | 2/1977 | Mohr ............................ 285/18 |
| 4,124,232 | 11/1978 | Ahlstone ............................ 285/18 |
| 4,178,020 | 12/1979 | Dopyera ............................ 285/18 |
| 4,298,221 | 11/1981 | McGugan ............................ 285/381 X |

Primary Examiner—Richard J. Scanlan, Jr.
Attorney, Agent, or Firm—Arnold, White & Durkee

[57] ABSTRACT

A locking slip coupling for coupling two tubular elements in sealed relationship. The coupling comprises a first tubular member having an outer end for connection to one tubular element, and having an inner end comprising an axially extending locking sleeve, the locking sleeve having an annular gripping zone defined by the locking sleeve having a plurality of annular gripping teeth along its inner surface in the gripping zone, having cam means along its outer surface in the gripping zone, and by the locking sleeve being radially compressible in the gripping zone. The coupling further comprises a second tubular member having an outer end for connection to another tubular element, and having an inner end comprising an inner barrel located within the locking sleeve. The coupling further has an annular locking piston which surrounds the gripping zone, the locking piston being axially displaceable relatively to the first tubular member between an inoperative position and an operative locking position, and the locking piston having a locking zone with complementary cam means along the inner surface of the piston in the locking zone to cooperate with the cam means of the gripping zone in the operative position of the piston to radially compress the gripping zone and thus compress the annular gripping member into sealing engagement with the inner barrel to lock the coupling.

50 Claims, 9 Drawing Figures

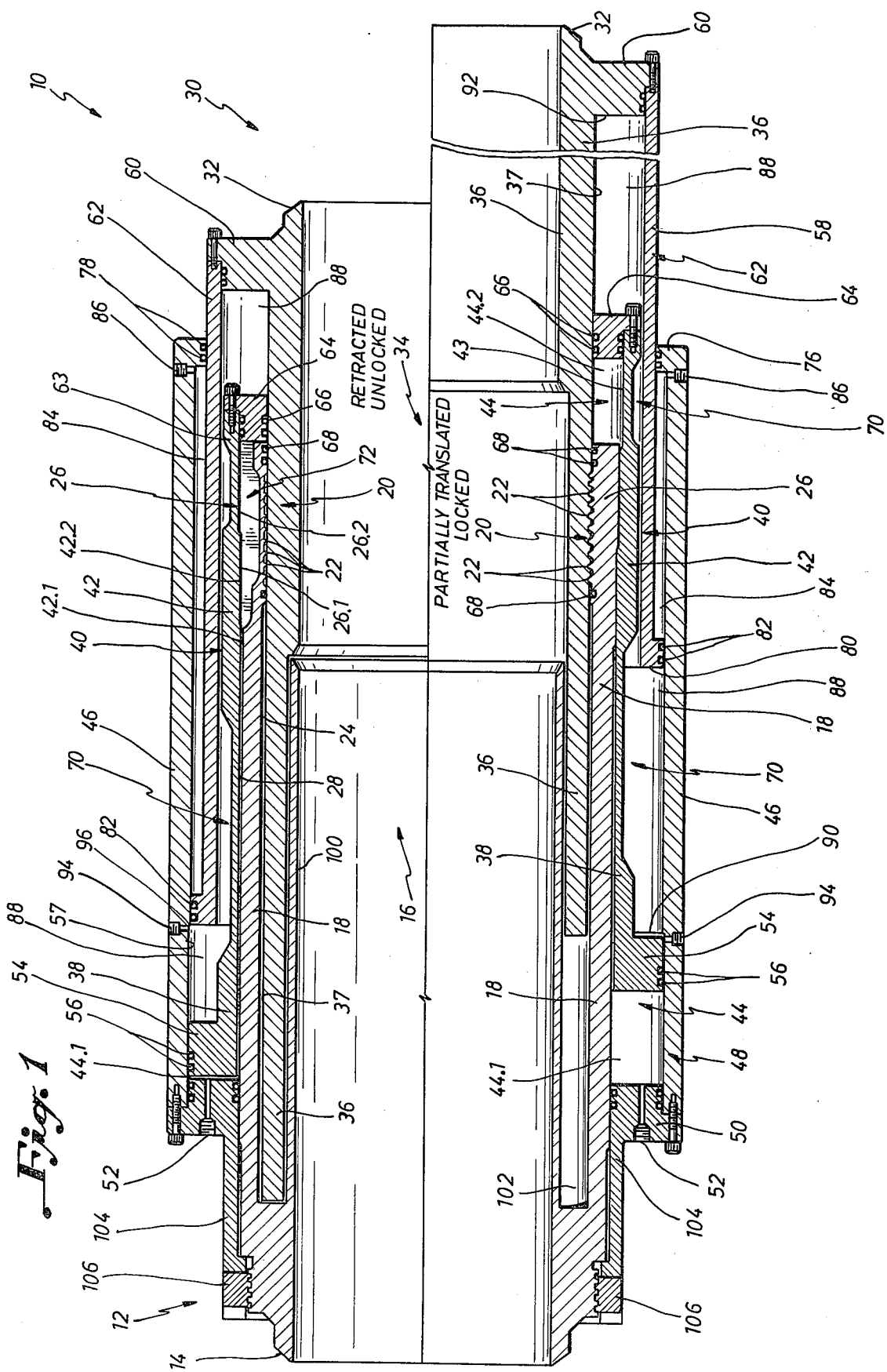

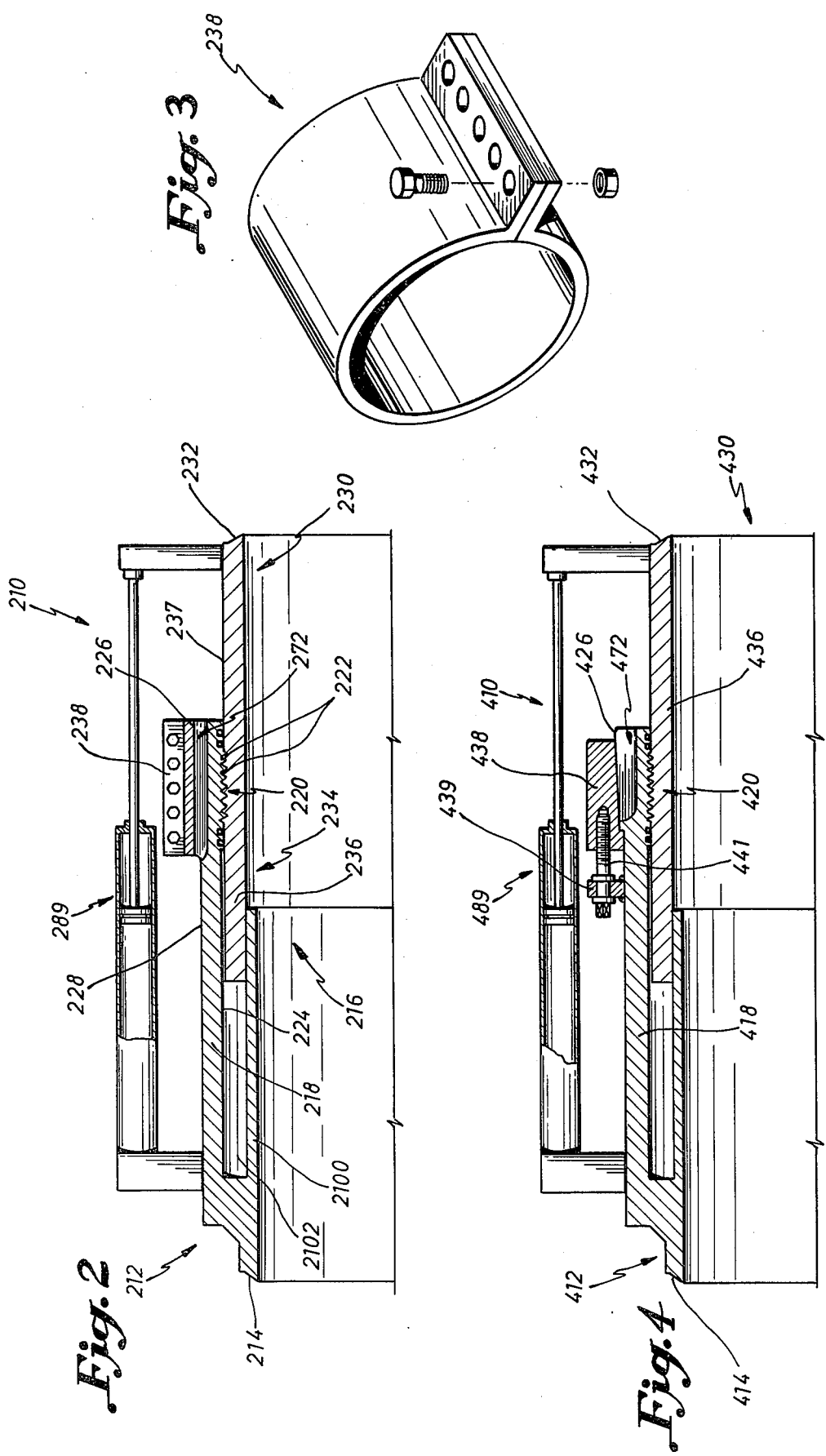

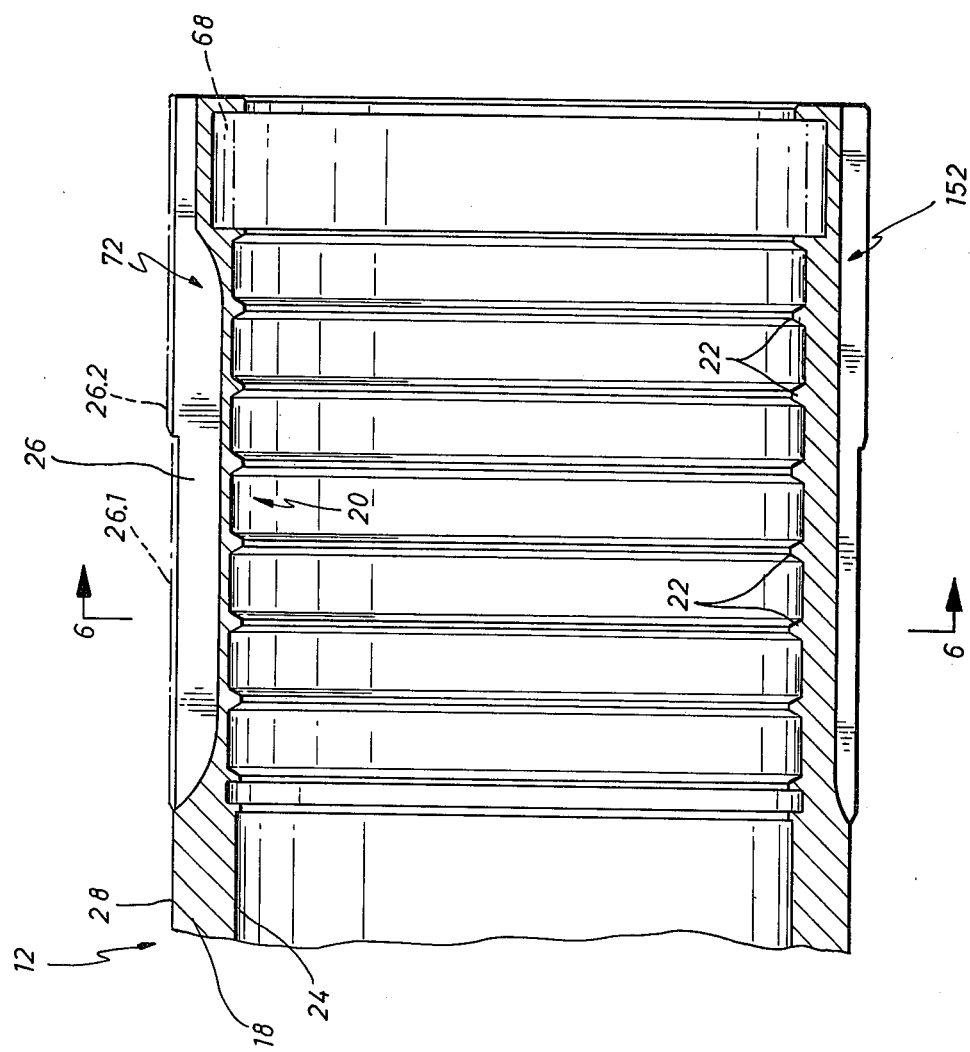

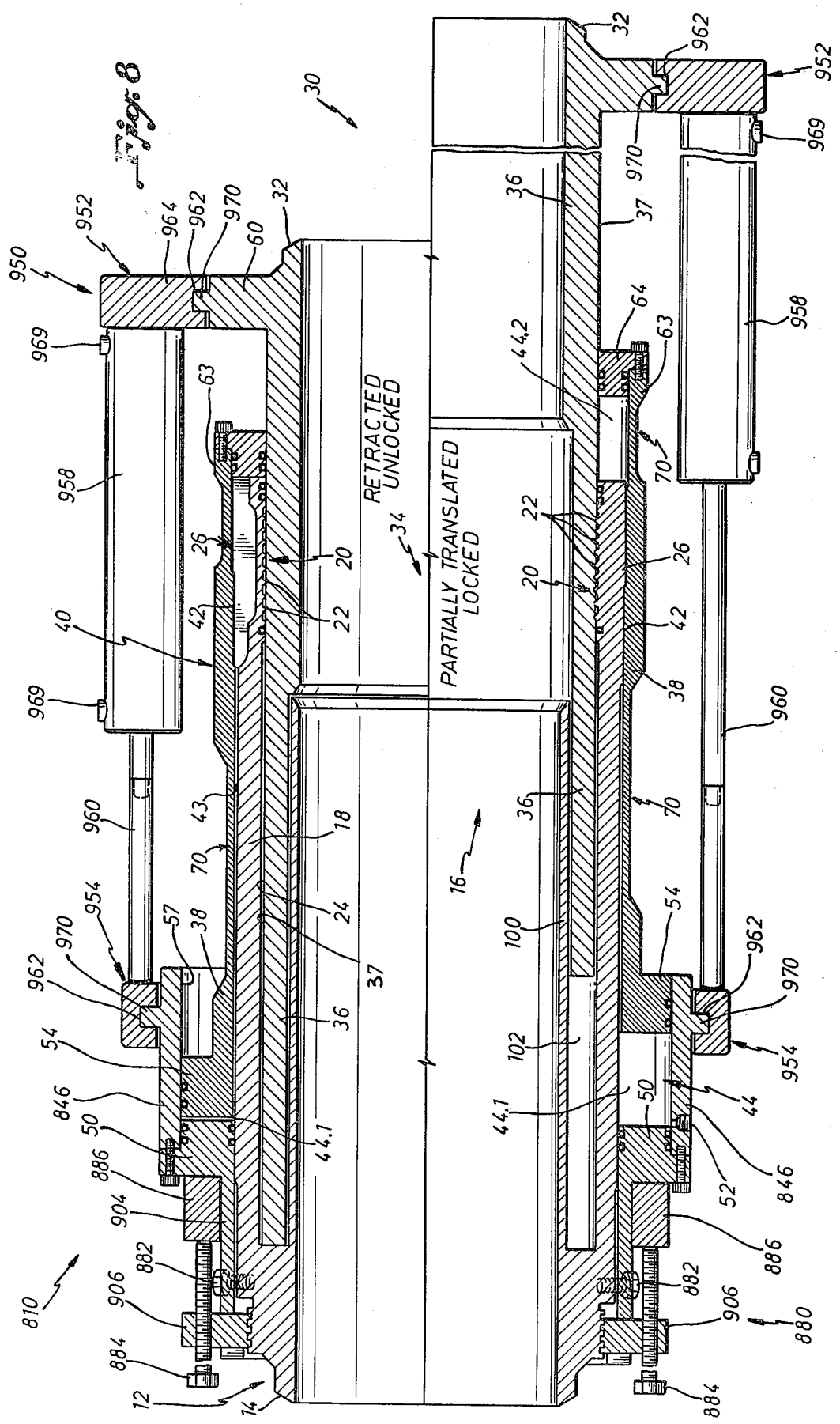

COUPLING

CROSS REFERENCE TO RELATED APPLICATIONS

This application is a continuation-in-part application of my copending application Ser. No. 214,251 filed Dec. 8, 1980 and now abandoned.

This invention relates to a coupling. More particularly, this invention relates to a coupling for coupling two tubular elements in sealed relationship; to a coupling element; and to a locking slip coupling for coupling two tubular elements in sealed relationship.

Applicants are aware of various types of couplings in which pairs of wedging elements are employed to secure two telescopically engaged tubular members together. The wedging elements normally have oppositely inclined wedging surfaces which cooperate during relative axial displacement of the wedging elements to cause radial expansion of one wedging element and radial compression of the other wedging element for the wedging elements to thereby engage the outer and inner tubular members and lock them together.

These types of couplings present a number of disadvantages. One disadvantage is that axial displacement of the wedging elements is normally effected mechanically with the result that such couplings have little utility in hazardous of inaccessible environments, particularly in subsea environments where minimal diver physical activity is essential.

These couplings present the further disadvantage that because of the inclined surfaces of the wedging elements, some backup locking means is necessary to ensure that the wedging elements remain in their locked position.

These couplings provide the further disadvantage that substantial frictional forces can arise during relative displacement of the wedging elements. This leads to the requirement that a substantial displacement force is required to displace the wedging elements, and to the requirement that the wall thicknesses of the tubular members must be substantial to provide resistance to radial deformation which would reduce the locking effect. This leads to wastage of material and to a substantial increase in the mass of the tubular members.

These couplings provide the further disadvantage that they cannot provide effective metal-to-metal sealing. Because the wall thicknesses of the tubular elements must be sufficient to provide proper axial strength, particularly in the case of high pressure couplings, relative radial displacement of the walls of the tubular elements into engagement with each other to provide metal-to-metal sealing, cannot be achieved. For this reason such couplings invariably use separate wedging elements and thus require conventional sealing means in the form of rings or packing of rubber or synthetic plastic material.

It is well-known that such conventional sealing rings have a limited life, particularly in hostile environments and conditions.

Thus in the case of high pressure couplings employed in subsea environments, while the materials of the couplings and their construction are such that they would have an extended useful life, their lives are substantially limited by the effective life of the sealing means.

This is a substantial disadvantage particularly in the case of couplings employed in hazardous and/or inaccessible environments. There is therefore a particular need for a high pressure subsea coupling which relies on effective metal-to-metal sealing to reduce the risk of leakage and the disadvantages inherent in the relatively limited life of conventional sealing means.

It is accordingly an object of this invention to provide couplings which would overcome or at least reduce some of these disadvantages.

The joining of two pipes or other tubular elements in subsea environments, usually requires the use of a spool piece of pipe which is connected to the ends of the two pipes or tubular elements to be joined to thereby splice them together.

When working with tubular elements which are buried in mud, which are of large diameter, which are in hazardous or inaccessible environments, such as subsea environments, or where stabbing length is required, it is desirable to have the capability of elongating the spool piece to accommodate the connection of the pipe ends. However, once the connection is complete, the length compensation device must function in the same capacity as the tubular elements or pipes in resisting pressure stresses, containing pressure, and providing the same axial strength as the tubular elements or pipe sections which are joined.

It is accordingly a further object of this invention to provide a locking slip joint which provides length compensation for joining pipes or other tubular elements.

According to one aspect of this invention, there is provided a coupling for coupling two tubular elements in sealed relationship, the coupling comprising:

(a) a first tubular member having an outer end for connection to one tubular element, and having an inner end comprising an axially extending locking sleeve, the locking sleeve having an annular gripping zone defined by the locking sleeve having at least one annular gripping member along its inner surface in the gripping zone, having cam means along its outer surface in the gripping zone, and by the locking sleeve being radially compressible in the gripping zone;

(b) a second tubular member having an outer end for connection to another tubular element, and having an inner end comprising an inner barrel located within the locking sleeve;

(c) an annular locking piston which surrounds the gripping zone, the locking piston being axially displaceable relatively to the first tubular member between an inoperative position and an operative locking position, and the locking piston having a locking zone with complementary cam means along the inner surface of the piston in the locking zone to cooperate with the cam means of the gripping zone in the operative position of the piston to radially compress the gripping zone and thus compress the annular gripping member into sealing engagement with the inner barrel to lock the coupling;

(d) the locking piston being positioned to define a compression chamber in the coupling for receiving a compression fluid under pressure to displace the piston into its operative position, the compression chamber extending through between the cam means and the complementary cam means for compression fluid pressure within the compression chamber to resiliently expand the locking zone relatively to the gripping zone to reduce interference between the cam means and complementary cam means during translation of the piston into its operative position.

The coupling may preferably be in the form of a locking slip coupling with the inner barrel being telescopically located within the locking sleeve.

In an embodiment of the invention the locking sleeve may have a plurality of axially spaced annular gripping members along the inner surface of the gripping zone.

The annular gripping members may preferably be in the form of annular gripping teeth, with the gripping teeth and the outer surface of the inner barrel being such that the gripping teeth can penetrate the outer surface of the barrel during radial compression of the gripping zone to engage the inner barrel and form a sealing engagement therewith.

In a preferred embodiment of the invention, the gripping zone is further defined by the locking sleeve having a plurality of circumferentially spaced axially extending recesses in its outer surface in the gripping zone to facilitate radial compression of the gripping zone.

The recesses in the outer surface of the locking sleeve reduce the hoop strength of the gripping zone to permit effective compression of the gripping zone and thereby permit an effective metal-to-metal seal between the gripping teeth and the outer surface of the barrel.

In this embodiment of the invention, axially extending ridges are defined between adjacent pairs of recesses in the gripping zone. These ridges conveniently define the cam means of the gripping zone.

While the recesses reduce the hoop strength of the gripping zone, they would also have the effect of reducing the axial strength of the gripping zone. This reduction in axial strength will be significant particularly in the case of high pressure couplings since the locking piston, being axially displaceable, cannot effectively contribute to the axial strength in the gripping zone.

In the preferred embodiment of the invention, therefore, the ridges are shaped to at least partially compensate for the reduction in axial strength which would otherwise be caused by the recesses in the gripping zone.

To facilitate radial expansion of the locking zone relatively to the gripping zone during axial translation of the locking piston by compression fluid pressure during use, the locking piston may have resiliently yieldable zones on opposed sides of the locking zone.

The resiliently yieldable zones may preferably be provided by the locking piston having zones of reduced wall thickness in the yieldable zones.

In an embodiment of the invention the inner end of the first tubular member may further comprise an axially extending outer sleeve which is radially spaced from the locking sleeve to define a first annular cylinder between them which extends axially in the direction of the inner end from an end wall joining the outer sleeve and the locking sleeve. In this embodiment of the invention the locking piston may have a trailing end which is slidably located in the first annular cylinder in sealing engagement with the inner surface of the outer sleeve to thereby define a trailing part of the compression chamber between the trailing end of the locking piston and the end wall.

In this embodiment of the invention the locking piston may further have a leading end which extends beyond the locking sleeve and which is slidably and sealingly engaged with the outer surface of the inner barrel thereby defining a leading part of the compression chamber between the inner surface of the locking piston, the leading end portion of the locking piston and the outer surface of the inner barrel, with the leading part of the compression chamber in communication with the trailing part between the locking zone and the gripping zone.

Further, in this embodiment, the inner barrel is sealingly engaged with the locking sleeve to complete the compression chamber.

In this embodiment of the invention the second tubular member may further have a axially extending outer barrel which is radially spaced from the inner barrel to define a second annular cylinder which extends from a closed radial flange axially away from the outer end of the second tubular member, with the outer barrel extending into the first annular cylinder and engaging sealingly with the inner surface of the outer sleeve to thereby define an extension chamber between the leading side of the leading end of the locking piston, the outer surface of the locking piston, the leading side of the trailing end of the locking piston and the inner surfaces of the outer sleeve and outer barrel for receiving a fluid under pressure to telescopically extend the second tubular member relatively to the first tubular member prior to locking of the coupling.

In a preferred embodiment of this aspect of the invention, the outer sleeve and the outer barrel overlap and are sealingly engaged with each other in axially spaced zones to define a retraction chamber for receiving a fluid under pressure to telescopically retract the second tubular member relatively to the first tubular member.

This embodiment of the invention therefore includes an integral translation assembly including the extension chamber and the retraction chamber for displacing the two members axially relatively to each other.

In an alternative embodiment of the invention each of the first and second tubular members may have mounting means for mounting an independent translation assembly on the coupling for axially displacing the first and second tubular members relatively to each other.

In this embodiment of the invention the coupling may include an independent translation assembly which is permanently or removably mounted on the coupling.

The independent translation assembly may conveniently be a hydraulic assembly for hydraulically displacing the members of the coupling. Thus, for example, the independent translation assembly may comprise a pair of mounting rings and a plurality of hydraulic cylinder assembly which connect the two rings for translation relatively to each other.

In a further embodiment of the invention the coupling may additionally include manually operable displacement means for displacing the locking piston into its operative position. The manually operable displacement means may conveniently be used when the integral or independent translation means, as the case may be, cannot be used.

The first tubular member may further comprise a central sleeve which is radially spaced within the locking sleeve to define an annular locating cylinder within the leading end of the first tubular member wherein the leading end of the inner barrel is received.

The invention further extends to a locking slip coupling for connecting two tubular elements in sealed relationship, the coupling comprising:

(a) a first tubular member having an outer end for connection to one tubular element, and having an inner end comprising an axially extending locking sleeve and an axially extending outer sleeve which is radially spaced from the locking sleeve to define a first annular cylinder which is closed at its trailing end and extends axially away from the outer end of the first tubular member;

(b) the locking sleeve having an annular gripping zone defined by at least one annular gripping surface along the inner surface of the locking sleeve, by cam means along the outer surface of the locking sleeve, and by the gripping zone being radially compressible;

(c) a second tubular member having an outer end for connection to another tubular element, and having an inner end comprising an inner barrel telescopically located within the locking sleeve in sealing engagement therewith;

(d) an annular locking piston which surrounds the gripping zone and extends axially from the locking sleeve to the inner barrel to bridge the junction between the locking sleeve and the inner barrel, the locking piston having complementary cam means to cooperate with the cam means of the gripping zone to radially compress the gripping zone and thereby compress the gripping surface into sealing and gripping engagement with the inner barrel to lock the slip coupling;

(e) the locking piston having a leading end which is sealingly engaged with the outer surface of the inner barrel and having a trailing end which is located in the first annular cylinder in sealing engagement with the inner surface of the outer sleeve to thereby define a compression chamber extending from the first annular cylinder and within the locking piston to the zone where the leading end of the locking piston engages with the inner barrel;

(f) means for connecting the compression chamber to a compression fluid under pressure for axially displacing the locking piston towards the second tubular member for the complementary cam means to cooperate with the cam means to radially compress the gripping zone.

The invention further extends to a coupling element for forming a sealed engagement with a tubular element, the coupling element comprising:

a first tubular member having a leading end comprising a locking sleeve for telescopically cooperating with such a tubular element;

the locking sleeve having an annular gripping zone adapted to be radially displaced for engaging with such a tubular element when it is telescopically associated therewith;

the gripping zone being defined by an annular gripping member along one surface of the locking sleeve to engage sealingly with such a tubular element to form an annular seal therewith when the gripping zone is radially displaced, and the gripping zone being further defined by circumferentially spaced, axially extending recesses in the other surface of the locking sleeve which reduce the hoop strength of the gripping zone for radial displacement thereof, and by axially extending ridges between the recesses which provide axial strength for the gripping zone.

In a preferred embodiment of this aspect of the invention, the annular gripping member is provided along the inner surface of the locking sleeve for engaging sealingly with the outer surface of such a tubular element telescopically located within the locking sleeve when the gripping zone is radially compressed.

It will be appreciated, however, that where such a tubular element will be positioned within the locking sleeve in a fixed axial position, the annular gripping member can be equally effective if it is provided integrally on the outer surface of such a tubular member.

In a preferred embodiment of the invention, the annular gripping member comprises a plurality of axially spaced, annular gripping teeth which are integral with the inner surface of the locking sleeve.

The teeth are such that they cooperate to provide a sufficient shear area to accommodate axial loads for which the coupling element is designed.

The coupling element may include an annular compression member for radially compressing the gripping zone.

The annular compressing member may be of any conventional type. Thus, for example, it may be in the form of a split compressing sleeve to be circumferentially contracted, or a compressing ring which is located on the coupling element for axial displacement thereon to cooperate with the gripping zone for compressing the gripping zone.

The coupling element may include any conventional means for displacing the compressing member.

According to a further aspect of the invention, there is provided a high pressure coupling for coupling two tubular elements in sealed relationship, the coupling comprising:

(a) a first tubular member having a trailing end for connection to one tubular element, and having a leading end comprising a locking sleeve having an annular gripping zone defined by circumferentially spaced, axially extending recesses in the outer surface of the locking sleeve which reduce the hoop strength of the gripping zone for radial compression thereof, and defined by axially extending ridges between the recesses which contribute to the axial strength of the gripping zone;

(b) a second tubular member having a trailing end for connection to another tubular element, and having a leading end comprising an inner sleeve for positioning within the locking sleeve to be overlapped by the gripping zone in an overlap zone;

(c) at least one annular gripping tooth which is integral with the surface of one of the sleeves to extend towards the adjacent surface of the other sleeve in the overlap zone; and (d) compressing means for radially compressing the gripping zone for the annular gripping tooth to penetrate the adjacent surface of the other sleeve and form an annular seal therewith.

In a preferred embodiment of this aspect of the invention, the axially extending ridges define cam means, and the compressing means comprises an annular compressing sleeve having complementary cam means along its inner surface, the compressing sleeve being axially displaceable relatively to the gripping zone for the cam means to cooperate with the complementary cam means to radially compress the gripping zone.

In this aspect of the invention, the cam means and complementary cam means are shaped to cooperate and provide for substantially uniform circumferential compression of the gripping zone and thus substantially uniform circumferential metal-to-metal sealing engagement between the or each annular gripping tooth and the outer surface of the inner sleeve.

The cam means and complementary cam means are thus shaped so that the annular compressing sleeve will exert a substantially uniform compression force throughout the inner circumference of the locking sleeve.

The appropriate circumferential configuration of the cam means and the complementary cam means may be determined by, for each recess configuration of a gripping zone, determining the pressure applied along the circumference of a gripping tooth, and then adjusting the design of the cam means and/or complementary cam means to provide a substantially even distribution of the compression pressure.

The profile of the cam means and complementary cam means may be designed, for each gripping zone having a particular recess configuration, by, for example, utilizing a commercially available finite element program in an appropriate computer in a manner known to those skilled in the art.

A typical commercially available finite element program is the ANSYS program. Various other finite element programs are also available commercially and are all adaptable for use in various high speed computers.

By the use of such a finite element program, an assembly of finite elements can be used to simulate the structure of the gripping zone, the inner sleeve and the compressing means, and the contact forces can then be determined at each point along the circumference of an annular gripping tooth.

Thereafter, the geometry of the cam means and/or complementary cam means can be adjusted, essentially on a trial and error basis, until the contact forces throughout the circumference of each gripping tooth are sufficiently equal to provide the required degree of circumferential metal-to-metal sealing.

Since the cost of manufacturing the gripping zone is related to the number of recesses provided in the gripping zone, the minimum number should be employed. It will be appreciated, however, that the number of recesses would tend to increase as the diameter of the gripping zone increases.

For gripping zone diameters of less than about 20 inches, between about 4 and 12 recesses may for example be provided, and conveniently 8 or 12 recesses may be provided; whereas 12 or more recesses may be provided for larger diameter gripping zones, and substantially more recesses for substantially greater diameter gripping zones.

In one example of the invention, where the complementary cam means provided by the inner surface of the compressing sleeve is circular, each ridge has its opposed axially extending edge zones circumferentially recessed to define an axially extending central cam zone to cooperate with the complementary cam means and thereby provide substantially circumferentially uniform compression of the annular gripping member into sealing engagement with the outer surface of the inner sleeve.

The outer end of each tubular member may be adapted for connection to a tubular element by any conventional means known to those skilled in the art. Thus, for example, the trailing ends may be so adapted by being of a suitable shape for welding to a tubular element, by having a bolting flange for bolting onto a corresponding bolting flange mounted on a tubular element, or the like.

While the coupling and locking slip coupling of this invention may have application in regard to the coupling of various types of tubular elements, they may have particular application in regard to the coupling of tubular elements in the form of pipeline sections, particularly large diameter pipeline sections, and particularly marine pipeline sections in subsea or other hazardous environments. Thus, for example, the locking slip coupling of this invention may have particular application in coupling tubular elements in the form of marine pipeline sections or tubular elements used during laying or repairing of under-water pipelines or pipeline systems for the transmission of oil, gas or other fluent materials.

The components of the couplings in accordance with this invention will be made of conventional materials which are appropriate for the intended application and environment of the invention during use. Thus, for example, for use on subsea environments, the couplings of this invention will be made of metal alloy materials which are in accord with the ANSI or the API standards, as required.

Preferred embodiments of the invention are now described by way of example with reference to the accompanying drawings.

In the drawings:

FIG. 1 shows a sectional side elevation of one embodiment of a locking slip coupling in accordance with this invention, with the upper half of the drawing showing the locking slip coupling in its retracted and unlocked condition, and with the lower half of the drawing showing the coupling in its partially translated or extended and locked condition;

FIGS. 2 and 4 show, to a reduced scale, fragmentary sectional side elevations of two alternative embodiments of locking slip couplings in accordance with this invention;

FIG. 3 shows a three-dimensional view of a compressing member forming part of the coupling of FIG. 2;

FIG. 5 shows, to an enlarged scale, a detailed fragmentary, sectional side elevation of the gripping zone of the coupling of FIG. 1, along line V—V of FIG. 6;

FIG. 8 shows a sectional side elevation of an alternative embodiment of a locking slip coupling in accordance with this invention, having an independent translation assembly instead of the integral translation assembly of the coupling of FIG. 1.

Figure 7:
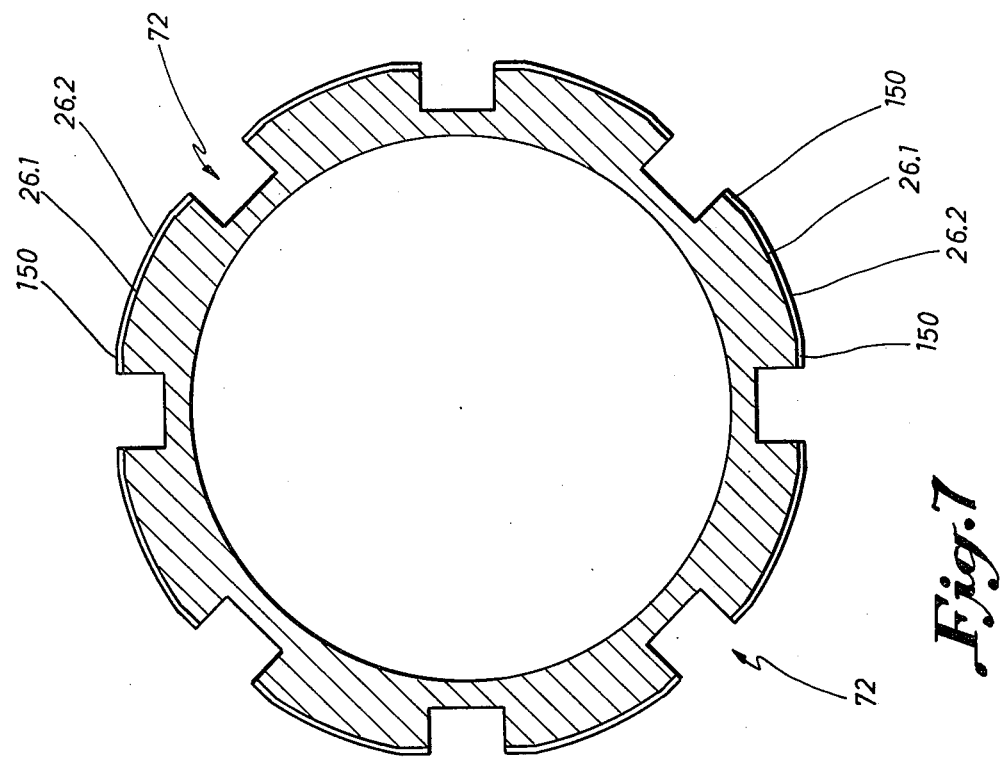
FIG. 7 shows a cross-sectional view similar to that of FIG. 6, of an alternative gripping zone having fewer recesses provided therein.

With reference to FIG. 1, reference numeral 10 refers generally to a locking slip coupling for use in a subsea environment for coupling two tubular elements (not shown) in the form of marine pipeline sections in sealed relationship.

The locking slip coupling 10 comprise a first tubular member 12 having an outer end 14 for connection to one tubular member or pipeline section.

The outer end 14 is shown having a beveled trailing end for being welded by conventional means to such a pipeline section.

The first tubular member 12 further has an inner end 16 which comprises an axially extending locking sleeve 18 having an annular gripping zone 20.

The gripping zone 20 is defined by the locking sleeve 18 having annular gripping members in the form of a plurality of axially spaced, circumferentially extending annular gripping teeth 22 provided along its inner surface 24 in the gripping zone 20.

The gripping zone 20 is further defined by cam means 26 along the outer surface 28 of the locking sleeve 18 in the gripping zone 20, and by the locking sleeve being radially compressible in the gripping zone 20.

The coupling 10 further comprises a second tubular member 30 having an outer end 32 for connection to another tubular element or pipeline section, and having an inner end 34 comprising an inner barrel 36 which is telescopically located within the locking sleeve 18 thereby permitting relative axial displacement of the inner barrel 36 relatively to the locking sleeve 18 for adjusting the length of the coupling 10 between its retracted condition as shown in the upper half of the drawing, its partially translated or extended condition as shown in the lower half of the drawing, and a fully translated or extended condition (not shown).

The inner barrel 36 and locking sleeve 18 are made of appropriate materials, which are appropriately treated as required, to ensure that the outer surface 37 of the inner barrel 36 has a lower degree of hardness than that of the annular gripping teeth 22 thereby ensuring that the annular gripping teeth 22 can penetrate the outer surface 37 when the gripping zone 20 has been radially compressed (as shown in the lower half of the drawing) to provide a substantial gripping engagement of the teeth 22 with the inner barrel 36 and, in addition to provide an effective and lasting metal-to-metal sealing engagement between the locking sleeve 18 and the inner barrel 36.

The inner barrel 36 is therefore conveniently, in this preferred embodiment of the invention, made of an AISI-1018 or equivalent alloy steel, while the locking sleeve 18 is conveniently of an AISI-4130 annealed alloy steel or the equivalent thereof.

It will be appreciated that the appropriate difference in hardness between the engaging surfaces may be achieved by utilizing suitable materials known to those skilled in the art and by treating them by heat treatment or the like as is conventional.

The locking slip coupling 10 further includes an annular locking piston 38 which surrounds the gripping zone 20 and which extends axially.

The locking piston 38 is axially displaceable between an inoperative position as shown in the upper half of the drawing and an operative locking position as shown in the lower half of the drawing for locking the slip coupling 10.

The locking piston 38 has a locking zone 40 with complementary cam means 42 along the inner surface 43 of the piston 38 to cooperate with the cam means 26 of the gripping zone 20 in the operative position of the piston 38 to radially compress the gripping zone 20 and thus compress the annular gripping teeth 22 into locking and sealing engagement with the inner barrel 36 as described.

The locking piston 38 is positioned in the coupling 10 to define a compression chamber 44 for receiving a compression fluid under pressure to displace the piston 38 into its operative position.

The inner end 16 of the first tubular member 12 further comprises an axially extending outer sleeve 46 which is radially spaced from the locking sleeve 18 to define a first annular chamber 48 which extends axially in the direction of the inner end 16 of the first tubular member 12 from an end wall 50 which sealingly joins the locking sleeve 18 to the outer sleeve 46.

The end wall 50 is provided with connection means in the form of a threaded bore 52 in which a nozzle of a conduit supplying a hydraulic compression fluid under pressure can be connected for supplying a compression fluid to the compression chamber 44 for axially displacing the locking piston 38.

The locking piston 38 has a trailing end portion which extends into the first annular chamber or cylinder 48, and has a radial flange 54 which extends radially outwardly from the trailing end of the locking piston 38.

The radial flange 54 has annular sealing rings 56 to provide a sealing engagement between the periphery of the radial flange 54 and the inner surface 57 of the outer sleeve 46.

The second tubular member 30 further has an axially extending outer barrel 58 which is radially spaced from the inner barrel 36 by means of a closed radial flange 60 proximate the outer end 32, to thereby define a second annular cylinder 62 which extends axially towards the inner end 34 of the second tubular member 30.

The outer barrel 58 extends into the first annular chamber 48 and is overlapped by the outer sleeve 46.

The locking piston 38 has a leading end 63 which extends into the second annular cylinder 62.

The locking piston 38 has a radially inwardly extending leading end flange 64 at its leading end 63 which engages sealingly with the outer surface 37 of the inner barrel 36 by means of a pair of sealing rings 66.

The compression chamber 44 therefore comprises a trailing part 44.1 which is defined between the end wall 50 and the radial flange 54 and a leading part 44.2 which is defined between the trailing side of the leading end flange 64 and the outer surface 37 of the inner barrel 36, with the trailing part 44.1 communicating with the leading part 44.2 within the locking piston 38 between the complementary cam means 42 of the locking zone 40 and the cam means 26 of the gripping zone 20.

To complete the compression chamber 44, the inner surface 24 of the locking sleeve 18 is sealingly engaged with the outer surface 37 of the inner barrel 36 by means of a plurality of annular sealing rings 68.

The locking zone 40 of the locking piston 38 is radially expandable relatively to the gripping zone 20 of the locking sleeve 18 so that when a compression fluid under pressure exerts pressure within the compression chamber 44 to displace the locking piston 38 into its operative position, the pressure of the compression fluid will at the same time expand the locking zone 40 radially outwardly and compress the gripping zone 20 radially inwardly thereby reducing the degree of interference between the cam means 26 and the complementary cam means 42.

The outer barrel 58 extends into the first annular chamber 48 and is overlapped by the outer sleeve 46.

This provides the substantial advantage that it reduces the magnitude of the force which is required to displace the locking piston 38 into its operative position and, in addition, by reducing the degree of interference between the cam means 26 and the complementary cam means 42, the wall thicknesses of the inner barrel 36 and of the locking piston 38 can be reduced substantially thereby reducing wastage of material and permitting a decrease in the cross-sectional dimension of the coupling 10.

Radial expansion of the locking zone 40 is enhanced by the locking piston 38 having resiliently yieldable zones 70 on opposed axial sides of the locking zone 40.

In the embodiment shown in the drawing, the resiliently yieldable zones 70 are provided by the locking piston 38 having wall thicknesses of reduced section in the zones 70 which thereby enhance resilient radial expansion of the locking zone 40.

Radial compression of the gripping zone 20 is provided by the locking sleeve 18 having axially extending, circumferentially spaced recesses 72 in its outer surface 28 in the gripping zone 20.

The recesses 72 are spaced circumferentially to reduce the hoop stiffness of the gripping zone 20.

The recesses 72 are arranged so that the cam means 26 is defined by axially extending circumferentially spaced ridges 26 defined between adjacent pairs of recesses 72 about the periphery of the gripping zone 20.

The annular locking piston 38 is formed of an appropriate material so that the locking zone 40 can expand resiliently to a limited extent during dislacement of the locking piston 38 into its operative position, and will then return towards its initial condition when the pressure of compression fluid in the compression chamber 44 is relieved to thereby maintain the gripping teeth in a firm metal-to-metal sealing and gripping engagement with the inner barrel 36.

The locking piston 38 may therefore be made of any suitable material known to those skilled in the art. In the preferred embodiment of the invention, the locking piston 38 is made out of an AISI-4130 or 4140 heat treated alloy steel, which has been heat treated to about 125,000 psi minimum yield.

The locking slip coupling 10 therefore provides the advantage that the axially spaced gripping teeth 22 function as multiple metal-to-metal seal rings for sealing the coupling 10 thereby making the coupling 10 particularly desirable for permanent installation since the permanence of metal sealing is well established.

In addition by providing locking of the coupling by way of intimate metal-to-metal contact, the first and second tubular members 12 and 30 will be permanently locked together thereby ensuring that the coupling 10 will function in the same capacity as the pipe sections which it couples together in resisting pressure stresses, in containing pressure and in providing axial strength.

The locking slip coupling 10 therefore provides the substantial advantage that it dispenses with conventional sealing means in the form of sealing rings or packing material of rubber, synthetic rubber, synthetic plastics material, or the like for maintaining the seal integrity of the coupling 10. The metal-to-metal sealing provided by the annular gripping teeth 22 penetrating into the outer surface 37 of the inner barrel 36 can, with proper design, be expected to remain effective during the effective life of the coupling 10.

This is a substantial advantage, particularly in subsea environments, since the integrity of the seal can be relied upon and since the expense involved in replacing inaccessible under or synthetic plastic material seals, will be avoided.

Because the annular locking piston 38 is axially displaceable, it can not contribute significantly to the axial strength of the coupling 10 in the gripping zone 20. Since the recesses 72 would have the effect of reducing the axial strength in the gripping zone 20, the ridges 26 are shaped to compensate for this reduction in axial strength thereby insuring that the axial strength of the gripping zone 20 remains substantially the same as the axial strength of the remainder of the locking sleeve 18, or is at least sufficient for the intended application of the invention.

The ridges 26 are therefore, as can be seen in FIGS. 1 and 5 of the drawings, enlarged radially relatively to the radial dimensions of the locking sleeve 18.

To achieve effective metal-to-metal sealing, the annular locking piston 38 must provide a circumferential compression force on the gripping teeth 22 which is substantial uniform throughout the circumference of the gripping teeth 22. This aspect is described in more detail with reference to FIGS. 5 to 7 of the drawings.

Since the locking piston 38 is manufactured of high strength steel which is capable of resiliently yielding, the locking piston 38 can "breathe" to accommodate thermal and pressure fluctuations of the inner barrel 36 without significantly relieving the gripping force and sealing effect originally achieved.

The outer barrel 58 and outer sleeve 46 may be made of any suitable conventional material. Generally, however, these components may be made out of mild steel or the like.

The outer sleeve 46 overlaps the outer barrel 58, and has a radially inwardly extending end flange 76 which engages sealingly with the outer surface of the outer barrel 58 via sealing rings 78.

The outer barrel 58 has a radially outwardly extending end flange 80 which engages sealingly with the inner surface of the outer sleeve 46 by means of sealing rings 82 thereby defining a retraction chamber 84.

A threaded bore 86 leads into the retraction chamber 84 for receiving a threaded nozzle of a fluid under pressure.

When the coupling 10 is in its unlocked condition, a fluid under pressure can be introduced into the retraction chamber 84 to retract the second tubular member 30 into the first tubular member 12 thereby reducing the axial length of the coupling 10.

An extension chamber 88 is further defined between the leading side 90 of the radial flange 54 and the trailing side 92 of the closed radial flange 60.

The extension chamber includes a threaded bore 94 which is provided in the outer sleeve 46 for receiving a nozzle of a fluid under pressure. A fluid under pressure can therefore be introduced into the extension chamber 88 to effect axial extension of the second tubular member 30 relatively to the first tubular member 12 when the coupling 10 is in its unlocked position.

The retraction chamber 84 together with the extension chamber 88 therefore constitute an integral translation assembly for the coupling 10.

As can be seen in the lower half of the drawing, the outer sleeve 46 has an annular lip 96 along its inner surface to provide a stop to be engaged by the leading side 90 of the radial flange 54 of the locking piston 38 when the piston 38 is in its operative position. The annular lip 96 therefore prevents the locking piston 38 from being displaced axially beyond its locking position.

The cam means 26 and complementary cam means 42 each comprise two axially spaced stepped formations 26.1 and 26.2, and 42.1 and 42.2 respectively. This provides the advantage that the locking piston 38 need not be translated more than about one-half of the resulting interfering length to effectively actuate the locking and sealing mechanism of the coupling 10. This provides the advantage that the coupling 10 can be shorter than would be the case if no stepped formations were employed.

The cam means 26 and the complementary cam means 42 are parallel with no relative angles between them. This provides the advantage that no backup locking means is necessary to maintain them permanently in their operative conditions.

In use, the outer ends 14 and 32 can be secured to tubular members in the form of pipe sections or spool pieces to be joined. This is conveniently done by welding.

Thereafter, by pumping a hydraulic fluid into the extension chamber 88 while the retraction chamber 84 is vented, the coupling 10 will be elongated axially. Conversely, if the coupling 10 is to be shortened axially, the extension chamber 88 will be vented while hydraulic fluid under pressure is pumped into the retraction chamber 84.

When the coupling 10 has its required axial length a hydraulic fluid under pressure is pumped into the compression chamber 44 while the extension chamber 88 is vented, to cause axial displacement of the locking piston 38 into its operative position thereby permanently locking the coupling 10.

The inner end 16 of the first tubular member 12 further comprises a center sleeve 100 which extends axially within the locking sleeve 18 to define an annular locating cylinder 102 within which the inner barrel 36 is received.

The outer sleeve 46 is located in position on the first tubular member 12 through the end wall 50 which extends integrally from a mounting sleeve 104, with the mounting sleeve being fixed in position by means of a securing nut 106.

The coupling 10 provides several further advantages. One advantage, which is particularly important in subsea environments, is that the coupling 10 can be operated effectively with a minimal amount of diver physical activity. Furthermore, by using a hydraulic fluid as the pressure medium, the fluid will automatically provide lubrication for cooperating surfaces during actuation of the coupling 10.

Since the translation components of the coupling 10 are in parallel with the locking components thereof, the stroke/overall length ratio of the coupling 10 is large.

The coupling 10 provides the further advantage that with the exception of extremely localized areas, all parts of the coupling 10 remain in the elastic deformation range. This greatly simplifies the design calculations and ensures predictable performance for the coupling 10.

A 10-inch coupling in accordance with the preferred embodiment as illustrated in the drawing was subjected to certain tension tests.

In the first test it was found that the maximum pressure required to activate the coupling 10 was 1,150 psi. The average lock-up pressure was found to be 850 psi and the majority of locking piston translation occurred at this pressure.

After the coupling was locked, it was filled with water and hydrostatically tested at pressures ranging from 500 psi to 3,300 psi.

In the second test the locked coupling was subjected to an effective tension of 511,000 pounds. The test showed a difference of 0.001 inches between the initial and final dial indicator readings. This small difference cannot be attributed to yielding or slippage and applicant believes it is attributable to acceptable measurement errors. The coupling 10 resisted all pressures and applied tensions.

With reference to FIGS. 2 and 3 of the drawings, reference numeral 210 refers generally to a high pressure coupling for coupling two tubular elements [not shown] in sealed relationship. The coupling 210 has operative components corresponding generally with those of the coupling 10. Corresponding components of the coupling 210 are therefore identified by corresponding reference numerals except that the prefix "2" is used before the reference numeral.

The coupling 210 comprises a first tubular member or coupling element 212 having a trailing end 214 for connection to one tubular element.

The first tubular member 216 has a leading end comprising a locking sleeve 218 having an annular gripping zone 220 defined by circumferentially spaced, axially extending recesses 272 in the outer surface 228 of the locking sleeve 218 which reduce the hoop strength of the gripping zone 220 for radial compression thereof.

The gripping zone 220 is further defined by axially extending ridges 226 between the recesses 272, which contribute to the axial strength of the gripping zone 220. The gripping zone 220 further has a plurality of axially spaced, annular gripping teeth 222 which extend radially inwardly from its inner surface 224.

The first tubular member or coupling element 212 further comprises a central sleeve 2100 which defines an annular locating cylinder 2102.

The first tubular member or coupling element 212 further comprises compressing means in the form of a split compressing sleeve [as shown in more detail and to an enlarged scale in FIG. 3] for radially compressing the gripping zone 220.

The coupling 210 is shown including a second tubular member 230 having an outer end 232 for connection to another tubular element, and having a leading end 234 which is telescopically positioned within the locking sleeve 218 with its inner end positioned within the annular locating cylinder 2102.

It will be appreciated, however, that instead of the second tubular member 230 being part of the coupling 210, the second tubular member 230 may equally be the leading end portion of an elongated tubular element. In this event, therefore, the first tubular member or coupling element 212 can be coupled to such a leading end portion of an elongated tubular element.

In the embodiment shown in the drawings, hydraulic translation means 289 (shown diagrammatically only) is mounted between the first and second tubular member 212 and 232 for use in telescopically extending or retracting the two members relatively to each other.

It will be appreciated that where the second tubular member 230 comprises the leading portion of an elongated tubular element, the hydraulic translation means 289 may either be temporarily connected to the member 230, or some other means may be provided for extending or retracting when required.

In use, when the first and second tubular members 212 and 230 are in their appropriate axial relationship, the compressing sleeve 238 can be compressed about the locking sleeve 218 to radially compress the gripping zone 220 onto the inner sleeve or inner barrel 236 of the leading end 234 of the second tubular member 230.

As described with reference to FIG. 1, upon radial compression of the gripping zone 220, the gripping teeth 222 penetrate the outer surface 237 of the inner sleeve 236 by deforming the outer surface thereby forming a firm engagement therewith and an effective metal-to-metal seal for sealing the coupling 210.

The inner annular surface of the split compressing sleeve 238 therefore in effect constitutes complementary cam means for cooperating with the ridges or cam ribs 226 to radially compress the gripping zone 220.

Again the configuration of the ridges 226 will be appropriate to achieve sufficiently even distribution of the compressing force throughout the circumferential area of the gripping zone 220 for effective circumferential sealing by the gripping teeth 222.

While the coupling 210 may be used in the same applications as the coupling 10, the coupling 210 would be cheaper but requires more diver activity for completing the coupling. The coupling 210 would therefore be used in preference to the coupling 10 in less hazardous or less inaccessible environments, such as in shallow waters, where the reduced cost of the coupling 210 is justified.

With reference to FIG. 4 of the drawings, reference numeral 410 refers to yet a further alternative embodiment of a coupling in accordance with this invention. The coupling 410 corresponds substantially with the coupling 210 and corresponding components are indicated by corresponding reference numerals except that the prefix "4" is used instead of the prefix "2".

In the couling 410, in place of the split compressing sleeve 238, the coupling 410 includes an annular compressing ring 438 which is located on the locking sleeve 418.

The compressing ring 438 has an axially tapered inner surface to define complementary cam means for cooperating with the cam means defined by the ridges 426 to compress the gripping zone 420. The degree of taper of the complementary cam means and the cam means 426 has been exaggerated in the drawing. In practice the dgeree of taper would be between about 2 and 3 degrees, for example.

The compressing ring 438 is mounted on the locking sleeve 418 by means of an annular shoulder 439 which is integrally mounted of the locking sleeve 418, and by means of bolts 441 which extend through the shoulder 439 at circumferentially spaced intervals and engage with the compressing ring 438. Axial displacement of the compressing ring 438 is therefore effected by rotating the bolts 441.

The coupling 410 would have similar applications to the coupling 210.

Figure 6:
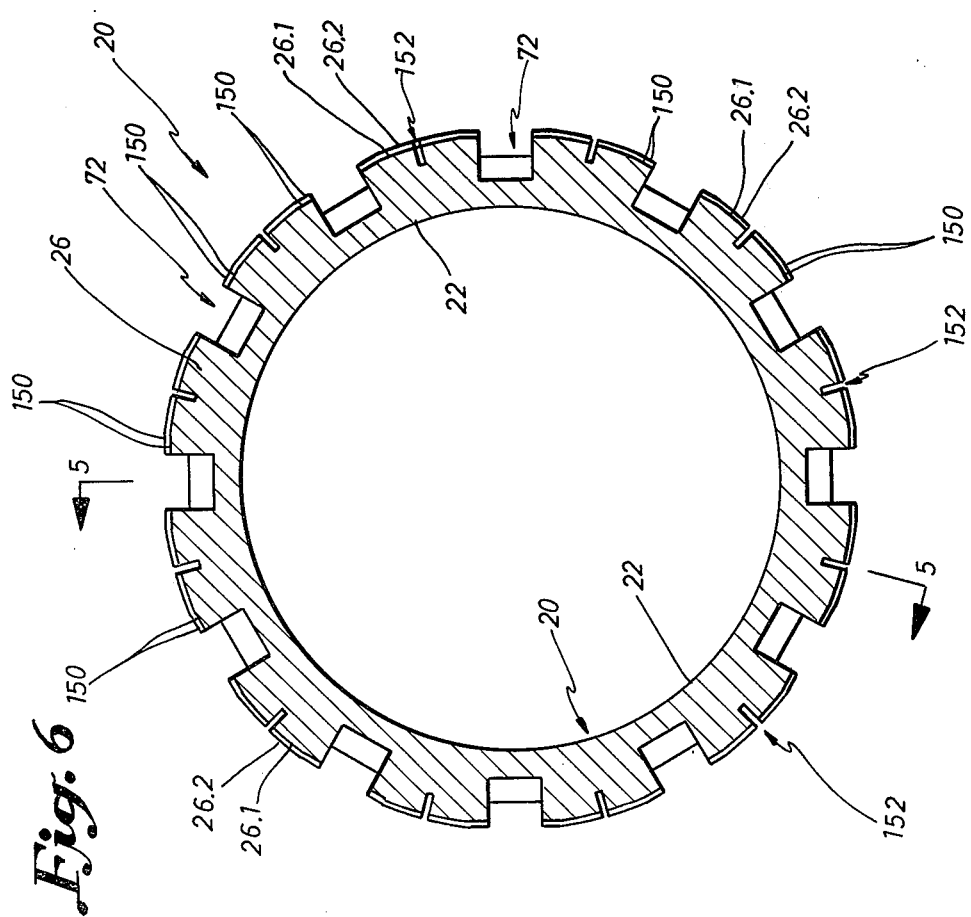
FIG. 6 shows a cross-sectional view of the gripping zone of FIG. 5, along line VI—VI of FIG. 5.

With specific reference to FIGS. 5 and 6 of the drawings, these drawings shown in more detail the configuration of the gripping zone 20 of the locking sleeve 18 of the coupling 10.

The gripping zone 20 is defined by 12 circumferentially spaced, axially extending recesses 72. The recesses 72 have a depth and a width sufficient to reduce the hoop strength sufficiently to permit effective radial compression of the gripping teeth 22 to effect engagement and sealing as hereinbefore described.

The axially extending ridges 26 which extend axially between adjacent pairs of recesses 72, extend radially beyond the outer periphery of the locking sleeve 18 to define the cam means 26.1 and 26.2 and, in addition, to increase the axial strength of the gripping zone 20 thereby compensating for the reduction of axial strength caused by the recesses 72.

The gripping zone 20 will therefore have a substantially equivalent quantity of material in the gripping zone cross section as the locking sleeve 18 has in its cross section, and will therefore have a substantially equivalent axial strength.

The gripping zone 20 therefore has its hoop strength reduced sufficiently to permit effective radial compression without significant reduction in axial strength.

The geometry of the ridges or cam means 26 as shown in FIGS. 5 and 6 of the drawings was developed by computer simulation of finite elements as hereinbefore described utilizing an ANSYS commercially available finite element program in a high speed computer.

The design was adjusted on a trial and error basis in relation to the contact forces calculated by the computer along the inner circumference of each gripping tooth 22 until the contact forces were sufficiently similar to provide an effective annular metal-to-metal seal between the annular gripping teeth 22 and the outer surface 37 of the inner sleeve 36.

It will be noted that each axially extending ridge 26 has its opposed axially extending edges 150 flattened to prevent contact between the edges 150 and the complementary cam means 42 of the locking piston 38 which is circular.

The complementary cam means 42 thus engages operatively with the axially extending, circumferentially curved central peripheral zones of each ridge or cam 26.

In addition, each ridge 26 has a central axially extending cut 152 to further facilitate even distribution of the compression force.

With this particular design it was found that the radial compression of the gripping zone 20 was sufficiently uniform throughout the circumference of each gripping tooth 22 to provide an effective high pressure metal-to-metal seal.

FIG. 7 shows an alternative embodiment of the gripping zone to that illustrated in FIGS. 5 and 6 of the drawings.

In FIG. 7, only eight recesses 72 are shown.

Again the computer assisted design indicated that effective pressure distribution by the locking piston 38 could be achieved by flattening the opposed edge zones 150 of the ridges 26 so that the stepped cam means 26.1 and 26.2 was defined by the central axially extending portions of the ridges 26.

It will be appreciated from FIGS. 1, 5, 6 and 7 that the various sealing rings incorporated in the coupling 10, are provided purely for initial setting up, axial adjustment and locking of the coupling 10. Once the coupling has been locked, it can rely exclusively on the metal-to-metal sealing to provide high pressure sealing.

This embodiment of the invention therefore provides the particular advantage that effective radial compression of the gripping zone 20 can be achieved in an effective manner, with minimum diver activity, to provide a high pressure metal-to-metal seal. The metal-to-metal seal will provide an effective seal for an extended period and further provides an effective axial locking of the coupling 10. While the hoop strength of the gripping zone 20 is reduced to provide for effective radial compression, the requisite axial strength of the gripping zone is provided by the axially extending ridges.

The axially extending ridges further serve as the cam means which, by appropriate design, results in a sufficiently even radial compressive force for effective circumferential sealing by the gripping teeth 22.

Figure 9:
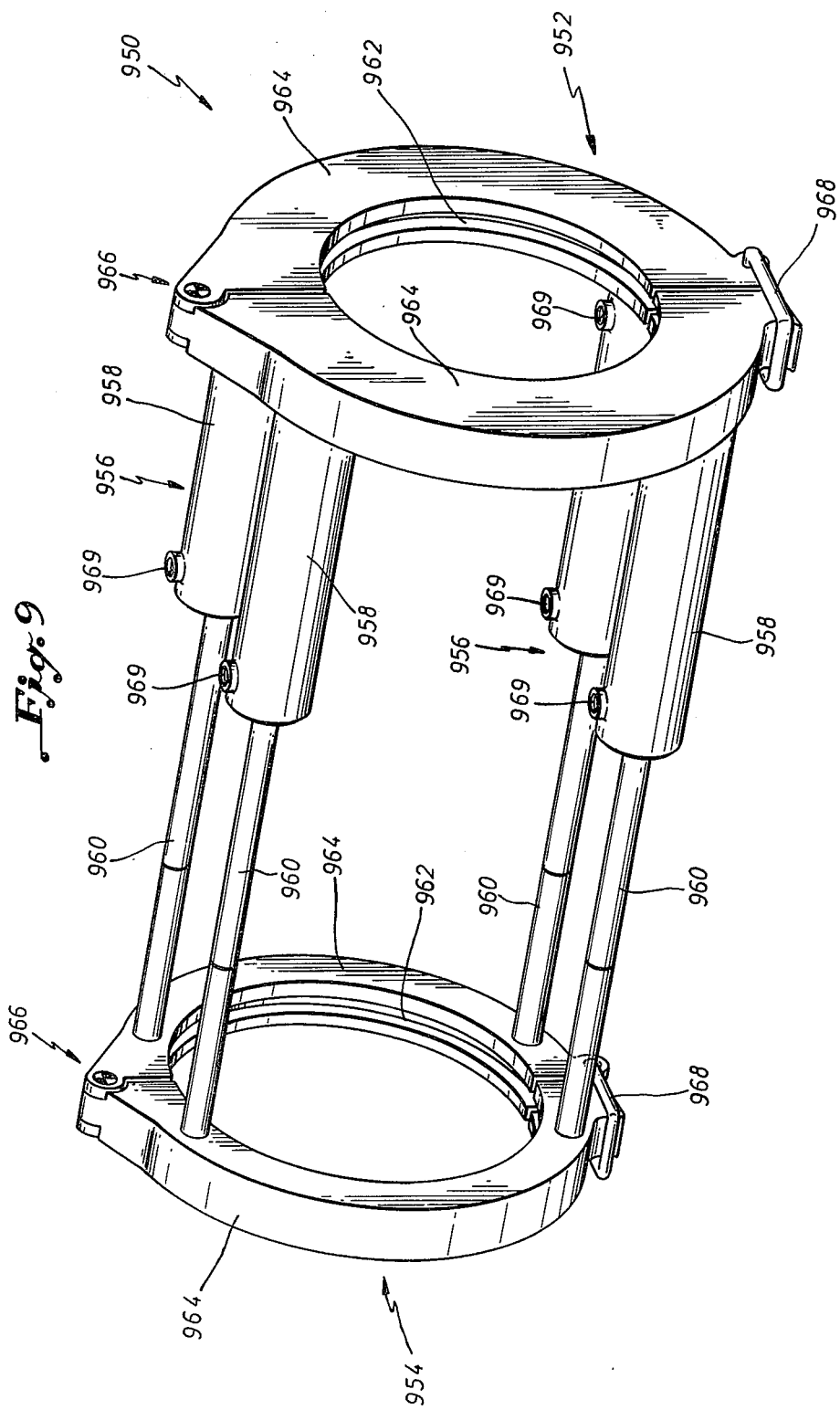
FIG. 9 shows, to a reduced scale, a three dimensional view of the independent translation assembly of FIG. 8.

With reference to FIGS. 8 and 9 of the drawings, reference numeral 810 refers generally to a coupling corresponding substantially with the coupling 10 of FIG. 1 except that the coupling 810 has been modified to provide for an independent removable translation assembly 950 instead of the integral translation assembly of the coupling 10, and to provide for manual displacement of the locking piston if required.

The coupling 810 corresponds essentially in all other respects with the coupling 10. Corresponding parts have therefore been identified with corresponding reference numerals to those used in FIG. 1.

The independent translation assembly 950 comprises a pair of mounting rings 952 and 954 and a plurality of hydaulic cylinder assemblies 956 which connect the two rings 952 and 954 for translation relatively to each other.

Each of the hydraulic cylinder assemblies 956 comprises a hydraulic cylinder 958 which is mounted on the mounting ring 952, which has a piston (not shown) slidably located therein, and which has a piston rod 960 extending from the piston and the hydraulic cylinder 958. Each piston rod 960 is mounted on the mounting ring 954.

Each of the mounting rings 952 and 954 has an internal annular mating recess 962 for mating with the coupling 810 as is described below.

Each mounting ring 952 and 954 further comprises two hingedly connected semicircular sections 964 which are hingedly connected to each other about a hinge 966. The sections 964 may thus be separated from each other to allow the independent translation assembly 950 to be mounted on the coupling 810, or to be removed from the coupling 810 after use. For mounting the assembly 950 in position, the semicircular sections 964 of each mounting ring 952 and 954, as the case may be, are locked together by suitable locking means 968. The locking means may conveniently, if desired, be in the form of an over center locking arrangement 968.

Each hydraulic cylinder 958 is provided with threaded ports 969 to which hydraulic fluid lines can be connected for telescopically extending or retracting the mounting rings of the assembly 950.

In the coupling 810 the closed radial flange 60 is provided with an annular mounting flange 970 to mate with the annular mating recess 962 of the mounting ring 952 to thereby firmly locate the mounting ring 952 on the coupling 810.

Likewise, the outer sleeve 846 of the coupling 810 is provided with an annular mounting flange 970 to mate with the annular mating recess 962 of the mounting ring 954 to thereby locate that mounting ring on the outer sleeve 846 and thus on the first tubular member 12.

In FIG. 8 of the drawings, the independent translation assembly 950 is shown mounted in its operative position on the coupling 810. As in the case of FIG. 1, the upper half of FIG. 8 shows the coupling 810 in its retracted, unlocked condition, whereas the coupling 810 is shown in the lower half of the drawing in its partially translated and locked condition.

In use, the outer ends 14 and 32 can be secured to tubular members in the form of pipe sections or spool pieces to be joined. This is conveniently done by welding.

Thereafter, by pumping a hydraulic fluid into the hydraulic cylinders 958, the translation assembly 950 and thus the coupling 810 can be elongated axially to the required extent.

When the coupling 810 has its required axial length, a hydraulic fluid under pressure can be pumped into the compression chamber 44 to cause axial displacement of the locking piston 38 into its operative position to thereby lock the coupling 810.

The independent translation assembly 950 may then be relaxed, the locking means 968 may be released, and the assembly 950 may then be removed for reuse on another coupling.

The embodiment of FIGS. 8 and 9 of the drawings therefore provides the advantage that the independent translation assembly 950 can be manufactured independently, can be applied to the coupling 810 when required for use, and can then be removed in a simple and effective manner for subsequent reuse on other couplings.

This embodiment provides the further advantage that the independent translation assembly can be manufactured out of relatively standard and easily producable components independently of the coupling 810. The cost of the independent translation assembly 950 will therefore tend to be substantially less than the cost of the integral translation assembly of the coupling 10. In addition, because of the expense of manufacturing the integral translation assembly of the coupling 10, not only will the coupling 810 be substantially less expensive than the coupling 10, but the combination of the coupling 810 and the independent translation assembly 950 will cost substantially less than the coupling 10.

The coupling 810 further includes manually operable displacement means 880 for use in manually displacing the locking piston 38 into its operative position when the piston cannot be hydraulically displaced for any reason such as, for example, failure of the seals which isolate the compression chamber 44.

The displacement means 880 is provided by the mounting sleeve 904 of the coupling 810 being slidably located on the first tubular member 12, but being axially located thereon by means of locking bolts 882. The locking bolts 882 will be removed when the manual displacement means 880 is to be used instead of the hydraulic displacement means via the compression chamber 44. The displacement means 880 comprises displacement bolts 884 which extend at circumferentially spaced intervals through threaded bores provided in the securing nut 906. The displacement bolts bear against a spacer ring 886 located on the mounting sleeve 904.

In use, when the hydraulic system has failed, the locking bolts 882 would be manually removed by a diver to free the mounting sleeve 904 for axial displacement along the locking sleeve 18 of the first tubular member 12.

Thereafter the diver would manually turn the displacement bolts 884 so that they push against the spacer ring 886. The spacer ring 886 will in turn push against the end wall 50 and will thus displace the end wall 50 and outer sleeve 846 together with the locking piston 38 until the locking piston has been displaced into its operative locked position. It will be appreciated that the independent translation assembly 950 will be vented during this operation to permit displacement of the outer sleeve 846 with the spacer ring 886 and the locking piston 38.

The manually operable displacement means provides for higher reliability. This is a distinct advantage particularly where the coupling 810 is being employed in a hostile or inaccessible environment.

The embodiment of the invention as illustrated in FIG. 8 of the drawings provides the further advantage that a diver or operator can verify that the locking piston 38 has been displaced fully into its operative locking position. This can be done by noting the position of the radial flange 54 of the locking piston 38 relatively to the free end of the outer sleeve 846. When the diver sees or feels that the end of the radial flange 54 is in line with the end of the outer sleeve 846, he knows that the locking piston 38 has been displaced into its final and effective locking position.

I claim:

1. A coupling for coupling two tubular elements in sealed relationship, the coupling comprising:
    (a) a first tubular member having an outer end for connection to one tubular element, and having an inner end comprising an axially extending locking sleeve, the locking sleeve having an annular gripping zone defined by the locking sleeve having at least one annular gripping member along its inner surface in the gripping zone, having cam means along its outer surface in the gripping zone, and by the locking sleeve being radially compressible in the gripping zone;
    (b) a second tubular member having an outer end for connection to another tubular element, and having an inner end comprising an inner barrel located within the locking sleeve;
    (c) an annular locking piston which surrounds the gripping zone, the locking piston being axially displaceable relatively to the first tubular member between an inoperative position and an operative locking position, and the locking piston having a locking zone with complementary cam means along the inner surface of the piston in the locking zone to cooperate with the cam means of the gripping zone in the operative position of the piston to radially compress the gripping zone and thus compress the annular gripping member into sealing engagement with the inner barrel to lock the coupling;
    (d) the locking piston being positioned to define a compression chamber in the coupling for receiving a compression fluid under pressure to displace the piston into its operative position, the compression chamber extending through between the cam means and the complementary cam means for compression fluid pressure within the compression chamber to resiliently expand the locking zone relatively to the gripping zone to reduce interference between the cam means and complementary cam means during translation of the piston into its operative position.

2. A coupling according to claim 1, which is in the form of a locking slip coupling with the inner barrel being telescopically located within the locking sleeve.

3. A coupling according to claim 1, in which the locking sleeve has a plurality of axially spaced annular gripping members in the form of annular gripping teeth along the inner surface of the gripping zone.

4. A coupling according to claim 3, in which the gripping teeth and the outer surface of the inner barrel are such that the gripping teeth penetrate the outer surface of the barrel during radial compression of the gripping zone to engage the inner barrel and form a sealing engagement therewith.

5. A coupling according to claim 1, in which the gripping zone is further defined by the locking sleeve having a plurality of circumferentially spaced axially extending recesses in its outer surface in the gripping zone to facilitate radial compression of the gripping zone.

6. A coupling according to claim 2 or claim 5, in which the locking piston has resiliently yieldable zones on opposed sides of the locking zone to facilitate radial expansion of the locking zone relatively to the gripping zone during translation of the locking piston by compression fluid pressure.

7. A coupling according to claim 6, in which the resiliently yieldable zones are provided by the locking piston having zones of reduced wall thickness in the yieldable zones.

8. A coupling according to claim 1, in which the inner end of the first tubular member further comprises an axially extending outer sleeve which is radially spaced from the locking sleeve to define a first annular cylinder between them which extends axially in the direction of the inner end from an end wall joining the outer sleeve and the locking sleeve, and in which the locking piston has a trailing end which is slidably located in the first annular cylinder in sealing engagement with the inner surface of the outer sleeve thereby defining a trailing part of the compression chamber between the trailing end of the locking piston and the end wall.

9. A coupling according to claim 8, in which the locking piston has a leading end which extends beyond the locking sleeve and which is slidably and sealingly engaged with the outer surface of the inner barrel thereby defining a leading part of the compression chamber between the inner surface of the locking piston, the leading end portion of the locking piston and the outer surface of the inner barrel, with the leading part of the compression chamber communicating with the trailing part between the locking zone and the gripping zone, and in which the inner barrel is sealingly engaged with the locking sleeve to complete the compression chamber.

10. A coupling according to claim 9, which is in the form of a slip coupling with the inner barrel being telescopically located within the locking sleeve.

11. A coupling according to claim 10, in which the second tubular member has an axially extending outer barrel which is radially spaced from the inner barrel to define a second annular cylinder which extends from a closed radial flange axially away from the outer end of the second tubular member, the outer barrel extending into the first annular cylinder and engaging sealingly with the inner surface of the outer sleeve, thereby defining an extension chamber between the leading side of the leading end of the locking piston, the outer surface of the locking piston, the leading side of the trailing end of the locking piston and inner surfaces of the outer sleeve and outer barrel for receiving a fluid under pressure to telescopically extend the second tubular member relatively to the first tubular member.

12. A coupling according to claim 11, in which the outer sleeve and outer barrel overlap and are sealingly engaged with each other in axially spaced zones to define a retraction chamber for receiving a fluid under pressure to telescopically retract the second tubular member relatively to the first tubular member.

13. A coupling according to claim 1 or claim 10, in which the first tubular member further comprises a central sleeve which is radially spaced within the locking sleeve to define an annular locating cylinder within the leading end of the first tubular member wherein the leading end of the inner barrel is received.

14. A coupling according to claim 5, in which the recesses reduce the hoop strength of the gripping zone for effective compression thereof, and in which axially extending ridges are defined between adjacent pairs of recesses, the ridges defining the cam means and the ridges being shaped to at least partly compensate for reduction in axial strength in the gripping zone caused by the recesses in the outer surface of the locking sleeve.

15. A coupling according to claim 14, in which the ridges are shaped to cooperate with complementary cam means of the locking piston to provide substantially uniform annular compression of the annular gripping member.

16. A locking slip coupling for connecting two tubular elements in sealed relationship, the coupling comprising:

(a) a first tubular member having an outer end for connection to one tubular element, and having an inner end comprising an axially extending locking sleeve and an axially extending outer sleeve which is radially spaced from the locking sleeve to define a first annular cylinder which is closed at its trailing end and extends axially away from the outer end of the first tubular member;

(b) the locking sleeve having an annular gripping zone defined by at least one annular gripping surface along the inner surface of the locking sleeve, by cam means along the outer surface of the locking sleeve, and by the gripping zone being radially compressible;

(c) a second tubular member having an outer end for connection to another tubular element, and having an inner end comprising an inner barrel telescopically located within the locking sleeve in sealing engagement therewith;

(d) an annular locking piston which surrounds the gripping zone and extends axially from the locking sleeve to the inner barrel to bridge the junction between the locking sleeve and the inner barrel, the locking piston having complementary cam means to cooperate with the cam means of the gripping zone to radially compress the gripping zone and thereby compress the gripping surface into sealing and gripping engagement with the inner barrel to lock the slip coupling;

(e) the locking piston having a leading end which is sealingly engaged with the outer surface of the inner barrel and having a trailing end which is located in the first annular cylinder in sealing engagement with the inner surface of the outer sleeve to thereby define a compression chamber extending from the first annular cylinder and within the locking piston to the zone where the leading end of the locking piston engages with the inner barrel;

(f) means for connecting the compression chamber to a compression fluid under pressure for axially displacing the locking piston towards the second tubular member for the complementary cam means to cooperate with the cam means to radially compress the gripping zone.

17. A locking slip coupling according to claim 16, in which the locking piston has an annular locking zone where the complementary cam means is provided, and in which the locking zone is resiliently expandable by compression fluid within the compression chamber during axial displacement of the locking piston to reduce frictional interference between the cam means and the complementary cam means during such displacement.

18. A locking slip coupling according to claim 16, in which the annular gripping surface comprises at least one annular gripping tooth for penetrating the outer surface of the inner barrel to thereby form a sealed gripping engagement therewith.

19. A locking slip coupling according to claim 16 or claim 17, in which the gripping zone is further defined by the locking sleeve having axially extending, circumferentially spaced recesses in its outer surface in the gripping zone to facilitate radial compression of the gripping zone, and in which the cam means comprises circumferentially spaced axially extending cam ribs defined between adjacent pairs of recesses.

20. A locking slip coupling according to claim 16 or claim 17, in which the second tubular member further includes an outer barrel which is radially spaced from the inner barrel to define a second annular cylinder which extends axially from the outer end towards the inner end of the second tubular member, in which the outer barrel extends into the first annular cylinder, in which the outer sleeve overlaps the outer barrel, and in which the free end of the outer sleeve is in sealing engagement with the outer surface of the outer barrel and the free end of the outer barrel is in sealing engagement with the inner surface of the outer sleeve in axially spaced zones thereby defining a retraction chamber in the overlap zone for receiving a fluid under pressure to effect retraction of the slip coupling, and defining an extension chamber in the first and second annular cylinders for receiving a fluid under pressure to effect extension of the slip coupling.

21. A coupling element for forming a sealed engagement with a tubular element, the coupling element comprising:

a first tubular member having a leading end comprising a locking sleeve for telescopically cooperating with such a tubular element;

the locking sleeve having an annular gripping zone adapted to be radially displaced for engaging with such a tubular element when it is telescopically associated therewith;

the gripping zone being defined by an annular gripping member along one surface of the locking sleeve to engage sealingly with such a tubular element to form an annular seal therewith when the gripping zone is radially displaced, and the gripping zone being further defined by circumferentially spaced, axially extending recesses in the other surface of the locking sleeve which reduce the hoop strength of the gripping zone for radial displacement thereof, and by axially extending ridges between the recesses which provide axial strength for the gripping zone.

22. A coupling element according to claim 21, in which the annular gripping member is provided along the inner surface of the locking sleeve for engaging sealingly with the outer surface of such a tubular element telescopically located within the locking sleeve when the gripping zone is radially compressed.

23. A coupling element according to claim 22, in which the annular gripping member comprises a plurality of axially spaced, annular gripping teeth for penetrating the outer surface of such a tubular element upon radial compression of the gripping zone to engage positively with such a tubular element and to form a metal-to-metal seal therewith.

24. A coupling element according to claim 22 or claim 23, including an annular compressing member for radially compressing the gripping zone.

25. A coupling element according to claim 24, in which the annular compressing member comprises a split compressing sleeve.

26. A coupling element according to claim 24, in which the annular compressing member comprises a compressing ring which is located on the coupling element, the locking sleeve having cam means along the gripping zone and the compressing ring having complementary cam means for cooperating with the cam means during relative axial displacement of the gripping zone and compressing ring to radially compress the gripping zone.

27. A coupling element according to claim 26, including displacement means for axially displacing the compressing ring.

28. A coupling element according to claim 21, or claim 22, including a hydraulic component for cooperation with a hydraulic component associated with such a tubular element to displace the coupling element and such a tubular element telescopically relatively to each other.

29. A coupling element according to claim 26, in which the cam means of the gripping zone is defined by the ridges of the gripping zone, and in which each ridge has its opposed axially extending edge zones circumferentially recessed to define an axially extending central cam zone to cooperate with the complementary cam means and provide for substantially circumferentially uniform compression of the annular gripping member into sealng engagement with the outer surface of such a tubular element.

30. A coupling element according to claim 21, in which the recesses are shaped for effective radial displacement of the gripping zone while the ridges are shaped to provide a material cross-section in the gripping zone corresponding generally to that in the locking sleeve.

31. A high pressure coupling for coupling two tubular elements in sealed relationship, the coupling comprising:
(a) a first tubular member having a trailing end for connection to one tubular element, and having a leading end comprising a locking sleeve having an annular gripping zone defined by circumferentially spaced, axially extending recesses in the outer surface of the locking sleeve which reduce the hoop strength of the gripping zone for radial compression thereof, and defined by axially extending ridges between the recesses which contribute to the axial strength of the gripping zone;
(b) a second tubular member having a trailing end for connection to another tubular element, and having a leading end comprising an inner sleeve for positioning within the locking sleeve to be overlapped by the gripping zone in an overlap zone;
(c) at least one annular gripping tooth which is integral with the surface of one of the sleeves to extend towards the adjacent surface of the other sleeve in the overlap zone; and
(d) compressing means for radially compressing the gripping zone for the annular gripping tooth to penetrate the adjacent surface of the other sleeve and form an annular seal therewith.

32. A coupling according to claim 31, which is in the form of a locking slip coupling with the inner sleeve telescopically positioned within the locking sleeve, and in which the annular gripping tooth extends integrally from the inner surface of the locking sleeve in the gripping zone towards the outer surface of the inner sleeve.

33. A coupling according to claim 32, in which the locking sleeve has a plurality of axially spaced annular gripping teeth extending inwardly from its inner surface in the gripping zone.

34. A coupling according to claim 32, including hydraulic means adapted to be actuated hydraulically for axially displacing the inner and outer sleeves telescopically relatively to each other.

35. A coupling according to claim 31 or claim 32, in which the axially extending ridges define cam means, and in which the compressing means comprises an annular compressing sleeve having complementary cam means along its inner surface, the compressing sleeve being axially displaceable relatively to the gripping zone for the cam means to cooperate with the complementary cam means to radially compress the gripping zone.

36. A coupling according to claim 35, in which the cam means and complementary cam means are shaped to prevent engagement between the complementary cam means and axially extending edge zones of the ridges adjacent the recesses to improve the uniformity of circumferential compression of the gripping zone.

37. A coupling according to claim 31, in which the ridges are shaped to substantially compensate for the reduction in axial strength of the gripping zone resulting from the recesses in the outer surface of the locking sleeve in the gripping zone.

38. A coupling for coupling two tubular elements in sealed relationship, the coupling comprising:
(a) a first tubular member having a trailing end for connection to one tubular element, and having a leading end comprising a locking sleeve having an annular gripping zone defined by circumferentially spaced, axially extending recesses in one surface of the locking sleeve which reduce the hoop strength of the gripping zone for radial displacement thereof while axially extending ridges between the recesses contribute to the axial strength of the gripping zone;
(b) a second tubular member having a trailing end for connection to another tubular element, and having a leading end comprising an inner sleeve for cooperating with the locking sleeve to be axially overlapped by the gripping zone in an overlap zone;
(c) an annular gripping member which is integral with a surface of one of the sleeves to be directed towards an adjacent surface of the other of the sleeves in the overlap zone; and
(d) radial displacement means for radially displacing the gripping zone to force the annular gripping member into sealing engagement with the adjacent surface of the other sleeve for forming an annular seal therewith.

39. A coupling according to claim 38, which is in the form of a locking slip coupling wherein the inner sleeve fits within and cooperates telescopically with the locking sleeve, in which the axially extending recesses and ridges are along the outer surface of the locking sleeve, and in which the radial displacement means comprises compressing means for radially compressing the gripping zone.

40. A coupling according to claim 39, in which the annular gripping member comprises at least one annular gripping tooth for penetrating the adjacent surface of the other of the sleeves when the gripping zone is radially compressed.

41. A coupling according to claim 39 or claim 40, in which the locking sleeve has cam means along its outer surface in the gripping zone, and in which the compressing means comprises an annular locking piston having a locking zone with complementary cam means along its inner surface, the locking piston being axially displaceable relatively to the gripping zone between an inoperative position and an operative position for the cam means to cooperate with the complementary cam means to radially compress the gripping zone.

42. A coupling according to claim 41, in which the cam means of the locking sleeve is defined by the ridges of the gripping zone, and in which the cam means and the complementary cam means are shaped for the complementary cam means to engage only axially extending circumferentially centralized cam zones of the ridges to provide for substantially uniform annular compression of the annular gripping member during use.

43. A coupling according to claim 41, including manually operable displacement means for axially displacing the locking piston into its operative position.

44. A coupling according to claim 41, in which the locking piston is positioned to extend over the gripping zone and define a compression chamber in the coupling for receiving a compression fluid under pressure to displace the locking piston into its operative position, the compression chamber extending through between the cam means and the complementary cam means for compression fluid pressure within the compression chamber to resiliently expand the locking zone relatively to the gripping zone to reduce interference between the cam means and complementary cam means during translation of the locking piston into its operative position.

45. A coupling according to claim 10, claim 31 or claim 38, in which each of the first and second tubular members has mounting means for mounting an independent translation assembly on the coupling for axially displacing the first and second tubular members relatively to each other.

46. A coupling according to claim 10, claim 31, or claim 38, including an independent translation assembly mounted on the coupling, the translation assembly comprising a pair of mounting rings and a plurality of hydraulic cylinder assemblies which connect the two rings for translation relatively to each other to thereby axially displace the first and second tubular members relatively to each other.

47. A coupling according to claim 46, in which each of the members has mounting means in the form of an annular mounting flange provided thereon, and in which each mounting ring has an annular mating recess engaged with one annular mounting flange.

48. A coupling according to claim 46, in which the independent translation assembly is removably mounted on the coupling.

49. A coupling according to claim 48, in which each mounting ring comprises a plurality of arcuate sections which are hingedly connected to each other, and which are locked together in annular configuration to mount the independent translation assembly on the coupling.

50. A coupling according to claim 1 or claim 31, additionally including manually operable displacement means for displacing the locking piston into its operative position.

* * * * *